July 21, 1959 H. S. FEDER 2,896,090

MAGNETIC FREQUENCY GENERATOR

Filed Feb. 10, 1954 2 Sheets-Sheet 1

INVENTOR
H. S. FEDER
BY Franklin Mohr
ATTORNEY

July 21, 1959 H. S. FEDER 2,896,090

MAGNETIC FREQUENCY GENERATOR

Filed Feb. 10, 1954

2 Sheets-Sheet 2

INVENTOR
H. S. FEDER
BY Franklin Mohr
ATTORNEY

United States Patent Office 2,896,090

Patented July 21, 1959

2,896,090

MAGNETIC FREQUENCY GENERATOR

Herbert S. Feder, Fanwood, N.J., assignor to Bell Telephone Laboratories, Incorporated, New York, N.Y., a corporation of New York Application February 10, 1954, Serial No. 409,362

3 Claims. (Cl. 307—88)

This invention relates to oscillators, particularly of the relaxation type, employing nonlinear circuit elements.

Oscillators of the type involved derive their energy from an alternating current source, as distinguished from the type which are energized by a source of direct current.

An object of the invention is to generate useful amounts of output power at any desired frequency in a wide range of frequencies below and above the input frequency.

Another object is to control the output frequency in a smooth and continuous manner by varying a circuit parameter.

A feature of the invention is that the oscillations are self-starting.

Another feature is that the oscillatory system is relatively stable with respect to variations in input voltage.

In accordance with the invention, the coupling between the alternating current source and the circuit branches containing the nonlinear circuit elements is accomplished by means of an unsaturated magnetic core and a plurality of windings which are operated substantially as linear circuit elements. The coupling is such that two circuit branches are provided which have equal magnetomotive force drops respectively and generally but not necessarily unequal numbers of turns in their respective windings. The two circuit branches have substantially the same frequency at which ferroresonance occurs. Because the number of ampere turns in the two branches tends to remain equal, the currents in the two branches are unequal. Upon the onset of ferroresonance the currents tend to diverge more and more in amplitude, accompanied by increasing distortion of wave form. Further increase of input results in a failure of sufficient current at the supply frequency, hereinafter referred to as $f_0$, to sustain resonance, whereupon the amplitude of oscillations abruptly falls off. After a few cycles, resonance is able to build up again. The result is a wave of the supply frequency $f_0$ with a modulated envelope of lower frequency, hereinafter referred to as $f_r$. Modulation frequencies $(f_0 \pm nf_r)$, separated by intervals of the envelope frequency thus appear ($n$ is an integer), above and below the supply frequency and any of the resultant frequency components may be selected and utilized by known methods. Circuit parameters may be varied to control the envelope frequency.

As is known in the art, ferroresonance is a term used in connection with circuits containing a variable inductance, that is, one the inductance of which is dependent upon the electromotive force impressed upon it because of the presence of ferromagnetic material as used for the core of an inductance coil or transformer. Such an inductance connected in circuit with a fixed capacitance provides a circuit which may resonate at a given impressed frequency within a more or less extended frequency band provided the proper amount of electromotive force is applied. It will be evident that at the impressed frequency the capacitance will have a fixed value of negative reactance. A variable inductance in series with the capacitance will have a value of positive reactance depending upon the amount of impressed electromotive force, which value generally will not initially equal the reactance of the capacitance. If the value of the impressed electromotive force is then varied there may be found a value of inductive reactance which does equal the reactance of the capacitance, whereupon the circuit will go into resonance, usually quite abruptly.

For published accounts of the concept of ferroresonance reference is made to the following articles published in the Transactions of the American Institute of Electrical Engineers, viz., "Ferroinductance as a Variable Electric Circuit Element," by J. D. Ryder, 1945, volume 64, pages 671–677, and "Resonant Nonlinear Control Circuits," by W. T. Thomson, 1938, volume 57, pages 469–476.

Figure 1:
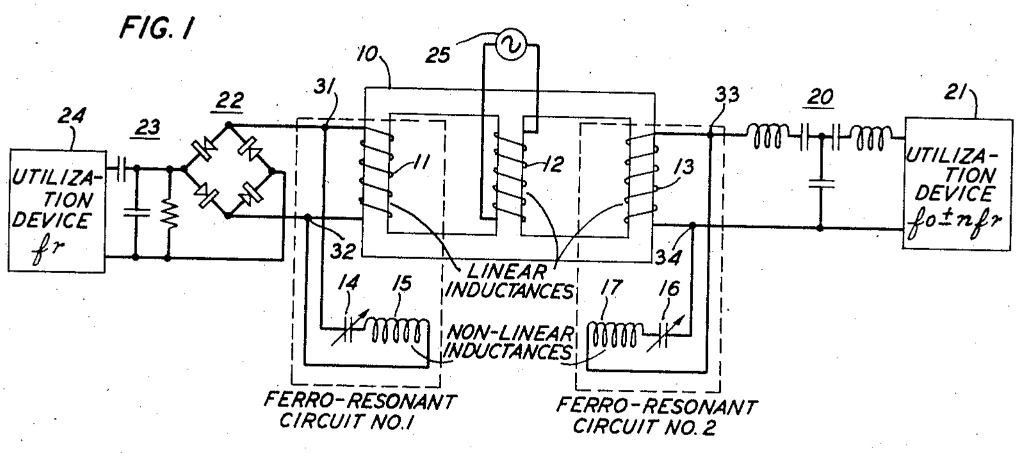
Fig. 1 is a schematic diagram of a system in accordance with the invention.

In the arrangement of Fig. 1, a three-legged magnetic core 10 forms a magnetic circuit for three linear inductances having respective windings 11, 12, and 13. A power source 25 of alternating current, conveniently 60 cycles per second but not limited thereto, is connected to the middle leg winding 12 as shown in the figure. The windings 11 and 13 are placed upon the outer legs of the core, so that the magnetic flux through the winding 12 divides, part going through winding 11 and part going through winding 13. Hence the sum of the fluxes through windings 11 and 13 is always substantially equal to the flux through winding 12.

Ferroresonant circuits, designated No. 1 and No. 2 for reference, of substantially equal resonant frequency are connected to include windings 11 and 13, respectively. Circuit No. 1 comprises a capacitor 14 in series with a nonlinear inductance 15, connected across terminals 31 and 32 of winding 11. Circuit No. 2 comprises a capacitor 16 in series with a nonlinear inductance 17 connected across terminals 33 and 34 of winding 13. If desired, the coils 15 and 17 may be identical and the capacitors 14 and 16 likewise identical, but the coils and capacitors may have other values provided both circuits will go into ferroresonance at about the same frequency.

Figure 2:
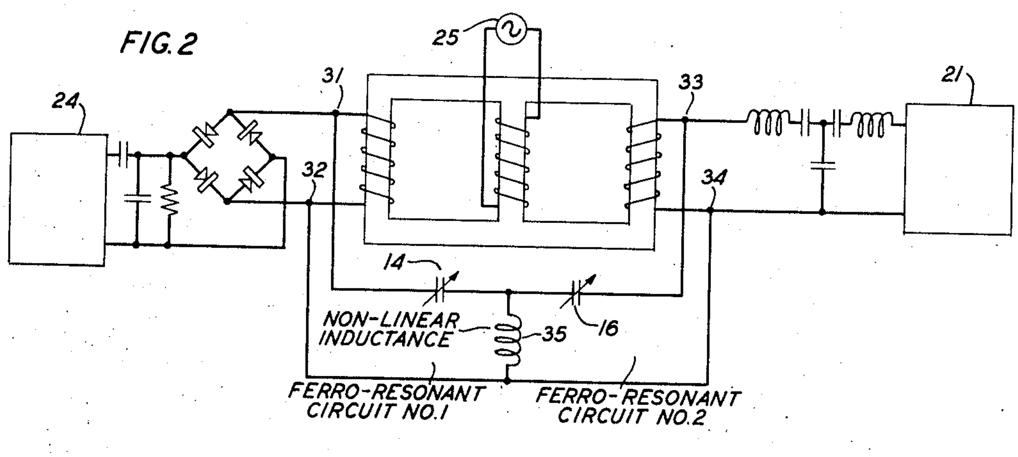
Figs. 2 and 3 are schematic diagrams showing variations of the system of Fig. 1.
Figure 3:
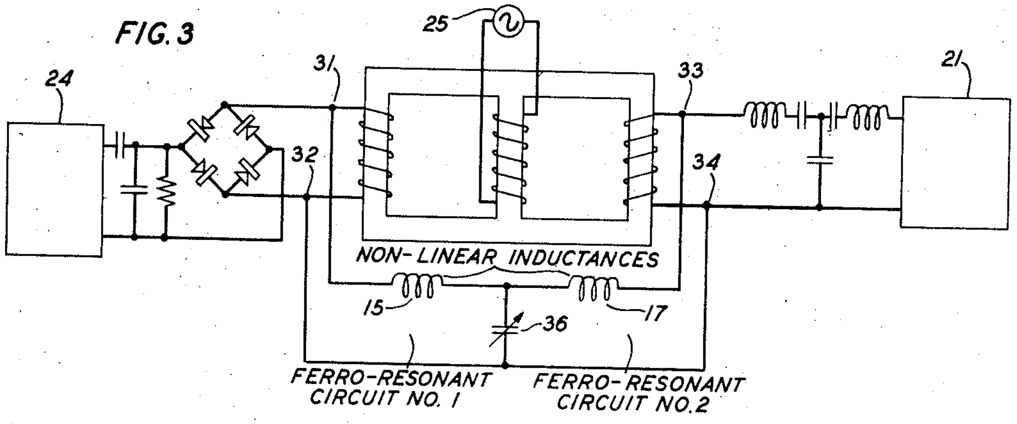

Figs. 2 and 3 show alternative arrangements of the ferroresonant circuits whereby the total number of circuit elements may be reduced by one element without material change in the operation or over-all result obtained by the system. In the arrangement of Fig. 2, a single nonlinear inductance 35 is common to both ferroresonant circuits while in the arrangement of Fig. 3, a single capacitor 36 is common to both circuits.

As implied hereinabove by reference to the windings 11, 12, 13 as providing linear inductances, the three-leg coil is operated below magnetic saturation. The core 10 is not magnetically biased and is preferably constructed so that any air gaps employed are reduced to a minimum.

Figure 4:
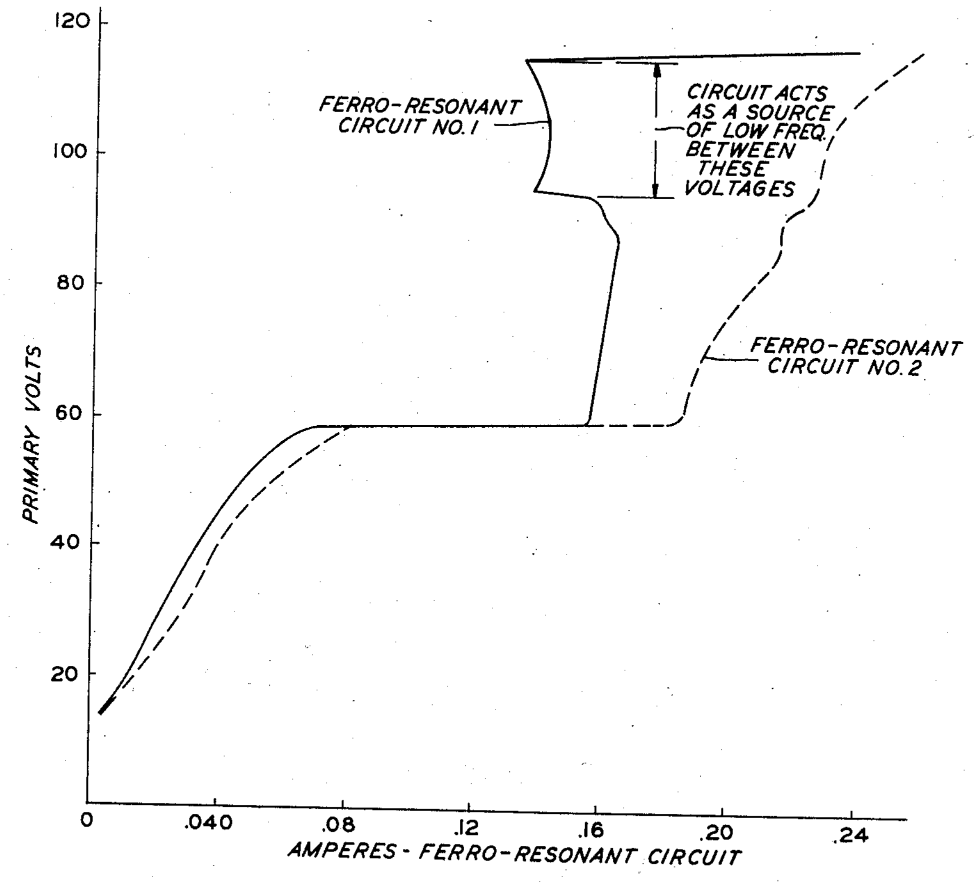
Fig. 4 is a graph of the relationship of voltage and current in certain portions of a system in accordance with the invention.

The root-mean-square values of voltage, current, and ampere turns in the several circuit branches of the arrangement of Fig. 1 vary as nonlinear functions of the input voltage, due to the presence of saturated inductances 15 and 17. Fig. 4 is illustrative of the operation of an arrangement that was built and successfully tested and shows the currents in ferroresonant circuits No. 1 and No. 2 as a function of the impressed voltage in winding 12. Windings 11 and 13 had 1600 turns and 1400 turns, respectively. Coils 15 and 17 had inductances nominally about five henries each and capacitors 14 and 16 had capacitances of one microfarad each.

Figure 5:
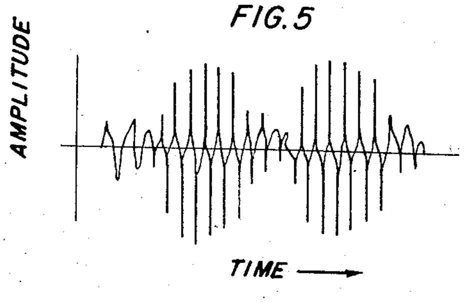
Fig. 5 is a graphical representation of an observed form of output wave from a system like that of Fig. 1.

Fig. 4 shows that as the input voltage is increased the current in both ferroresonant branches increases slowly and substantially linearly at first, until an unstable or "jump" point is reached whereupon both branches go into ferroresonance. Both branches make the jump at substantially the same value of input voltage. This results from the fact that the total drop in magnetomotive force in each of the outside legs of the core is the same. Therefore, if the magnetic flux in the two outside legs is approximately the same, the numbers of ampere turns in the two outside legs must also be approximately equal. From this it can be seen that when ferroresonant circuit No. 1 containing capacitor 14 and nonlinear inductance 15 goes into resonance, the current increases markedly, thus increasing the number of ampere turns in that branch. Accordingly the number of ampere turns in ferroresonant circuit No. 2 must likewise increase, forcing this circuit to jump. When both branches go into resonance, the branch with the higher number of turns does not jump to as high a current as the branch with the lower number of turns. This is because of the tendency to balance the numbers of ampere turns in the two outside legs. After going into ferroresonance, the current in winding 11 tends to remain at an approximately constant value over a considerable range of input voltage. With a further continued increase in input voltage, the current in winding 11 starts to decrease rather sharply and the entire system then goes into a a relaxation type of oscillation changing abruptly between two temporarily stable states. The result is a modulated wave comprising the supply frequency from the source 25 jumping from one amplitude to another at a repetition rate that is slow compared to the frequency of the source 25. In a system that was operated, the source frequency was 60 cycles per second and the output wave was a 60 cycle wave modulated at a rate of about 14 cycles per second. A typical wave form from the output of one of the ferroresonant circuits is shown in Fig. 5. A spectrum analysis of the modulated wave showed the presence of components at 60±14, 60±28, 60±42, etc., cycles per second. More generally, the output frequencies are $(f_o \pm nf_r)$, as hereinbefore defined. Any of the frequencies in the output wave may be selected at almost any point in the system as by suitable tuned circuits coupled for example to either of the ferroresonant circuits or to the input winding 12.

The envelope frequency may be changed smoothly and continuously by varying the capacitors, the nonlinear inductances or the turns ratio of the windings 11 and 13. Windings 11 and 13 may even have equal numbers of turns provided the nonlinear circuits are not otherwise identical. Capacitors 14 and 16 are shown variable, as illustrative of a means of envelope frequency adjustment.

Observations of the waveforms of the voltages across the windings 11 and 13 show that the waveforms are essentially sinusoidal while the amplitudes are below the values associated with ferroresonance. When the system goes into ferroresonance the waveforms of the voltages across the windings 11 and 13 become increasingly distorted until at the voltage immediately preceding the oscillatory condition the waveform scarcely at all resembles a sinusoidal wave and is extremely distorted. It has been observed that if the circuit is made as symmetrical as may be (equal numbers of turns in windings 11 and 13, identical coils 15 and 17 and identical capacitors 14 and 16) the waveforms after the circuit goes into ferroresonance are substantially sinusoidal. The symmetrical circuit requires a comparatively high input voltage to go into oscillation and the waveform becomes seriously distorted only at the point just preceding oscillation.

It would appear that if the systems were made exactly symmetrical, the magnitude and phase of the current in each outside leg would be the same as in the other outside leg and both would be sinusoidal. No modulation would then be obtained. However, in all practical systems, as a result of the special type of coupling that exists between the outside legs whereby the magnetomotive drop across the outside legs must be equal, any lack of symmetry in the system is accompanied by increased tendency toward distortion of the voltages across both windings 11 and 13. As the input voltage is increased, a point is ultimately reached where the distorted waveform will no longer maintain the system in resonance. Hence the current drops off sharply. After a few cycles of the supply frequency the system is able to build up to resonance again. This process of building up and falling off is repeated, being kept up by means of energy supplied by the source 25.

Various known techniques are available for taking outputs from the device of Fig. 1 at any of the output frequencies. The outputs may be taken off from any of the circuit components, providing the take-off device does not seriously disturb the operating conditions of the main circuits. A convenient location for a take-off device is in parallel with one of the windings 11 or 13. Two such arrangements are shown in Fig. 1. For taking off one of the output frequencies $(f_o \pm nf_r)$ a band pass filter 20 designed to pass the desired frequency and of input impedance high compared to the impedance of the combination of the elements 16, 17 may be shunted across the winding. The output terminals of the filter may be connected to any suitable utilization device 21 as shown. For taking off one of the envelope frequencies $nf_r$ a detector 22 may be shunted in similar manner, as shown across winding 11. The output of the detector may be connected through any suitable coupling network 23 to any suitable utilization device 24. The detector will serve to demodulate the modulated wave, thereby recovering the frequency $f_r$ or a harmonic thereof, $nf_r$, as desired. Output circuits of the two types illustrated, or other suitable output circuits, may be used either singly or together to meet service requirements.

The invention is not to be construed as limited to the particular embodiment, arrangement, or details disclosed herein.

What is claimed is:

1. In combination, a source of alternating current, two ferroresonant circuit branches of substantially equal resonant frequency each containing a coupling winding, said ferroresonant circuit branches having unequal impedances, and means to impress magnetization of equal ampere turns upon said windings from said source, said source supplying current sufficient to induce resonance in both said circuits but insufficient to continuously support resonance in said circuits whereby a distorted waveform resulting from relaxation oscillation of the over-all circuit is obtained.

2. In combination, a source of alternating current, a linear transformer having an input winding connected to said source and having two output windings of unequal numbers of turns, and a pair of nonlinear circuits branches connected respectively across the said output windings, said nonlinear circuit branches having substantially equal frequencies of ferroresonance, said source supplying current sufficient to induce resonance in both said circuits but insufficient to continuously support resonance in said circuits whereby a distorted waveform resulting from relaxation oscillation of the over-all circuit is obtained.

3. In combination, a source of alternating frequency, a linear transformer having an input winding connected to said source and having two output windings of unequal numbers of turns, and a pair of substantially identical nonlinear circuit branches connected respectively across the said output windings, said nonlinear circuit branches being ferroresonant at substantially the frequency of the source, said source supplying current sufficient to induce resonance in both said circuits but insufficient to continuously support resonance in said circuits whereby a distorted waveform resulting from relaxation oscillation of the over-all circuit is obtained.

References Cited in the file of this patent

UNITED STATES PATENTS

| | | |
|---|---|---|
| 2,484,866 | Strickland | Oct. 18, 1949 |
| 2,653,254 | Spitzer et al. | Sept. 22, 1953 |